UNITED STATES PATENT OFFICE.

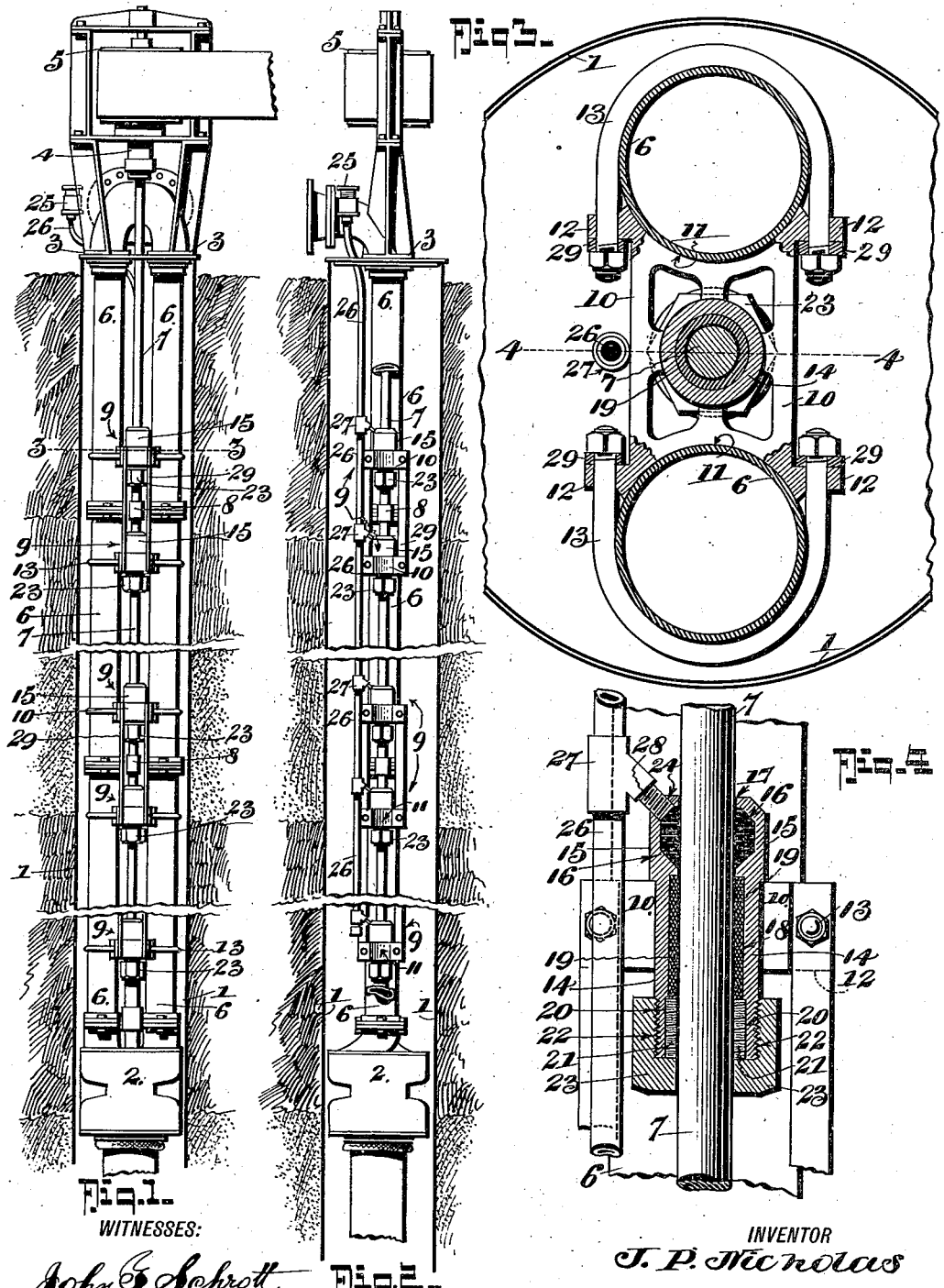

JAMES P. NICHOLAS, OF STUTTGART, ARKANSAS.

CENTRIFUGAL PUMPING APPARATUS.

1,191,337.   Specification of Letters Patent.   Patented July 18, 1916.

Application filed January 23, 1915. Serial No. 3,984.

*To all whom it may concern:*

Be it known that I, JAMES P. NICHOLAS, residing at Stuttgart, in the county of Arkansas and State of Arkansas, have invented certain new and useful Improvements in Centrifugal Pumping Apparatus, of which the following is a specification.

In centrifugal pumping apparatus for deep well work, of the type wherein the pump is suspended in the well pit a considerable distance underground, it is necessary to provide means whereby the suspended structure will be rigidly sustained and it should be so designed that the pump can be located at predetermined distances from the surface, according to the depth of the well. In order that a pumping apparatus of this type may be found practical and useful, it is necessary to make the shafting and piping in lengths determined by the standards of the manufacturers of such parts, and to provide the shaft with guide bearings at frequent intervals to prevent whipping. Various constructions have heretofore been proposed which have been designed to fulfil, as fully as practicable, the requirements met with in practice. Nearly all of those pumping apparatus of this general type which have come upon the market in recent years, have employed pipes extending from the pump neck to the head bearing and inclosing the shaft and its bearings throughout the length thereof to prevent access of water, sand and grit to the several bearings, the pipe, or shaft casing, as it is commonly called, has also usually served as an oil conduit for conveying oil successively from the uppermost bearing through the intermediate bearing to the pump neck bearing. This construction of pumping apparatus has been found costly and ofttimes of doubtful utility, owing to the great difficulty experienced in alining the bearings and bracing the structure to maintain proper coördination of the parts. It was to overcome, in a large measure, these objectionable features that the apparatus of my co-pending application filed July 8, 1914, Serial No. 849,817 was devised and in order to more fully eliminate the necessity of employing pipe sections around parts of the shafting, I have devised the structure which forms the subject-matter of this application, the same being essentially a modification of the structure shown in my co-pending application before referred to.

In my present invention I employ a series of bearings and bracing members arranged at suitable intervals to give lateral support to the shafting and bind the shafting and discharge pipes into a rigid structure throughout the length thereof, the shafting being open or exposed throughout its length (except where it passes through the bearings) from the pump neck to the top of the well and, below the water level, the shaft and its bearings are immersed in the water in the well pit; the bearings, however, are of a special construction and are lubricated individually from a common pipe line by laterals or branches that deliver the grease or other lubricant from the pipe line into the pockets of the bearings; the bearings are so designed that they can be clamped to the discharge pipes at intervals to form a rigid structure.

More subordinately, the invention includes those novel details of construction, combination and arrangement of parts, all of which will be first fully described, then specifically pointed out in the appended claims, reference being had to the accompanying drawing, in which:—

Figure 1 is a side elevation showing the invention in use, the well pit being shown in section. Fig. 2 is a view similar to Fig. 1 taken at right angles thereto and showing the location of the lubricant pipe line. Fig. 3 is an enlarged horizontal section on the line 3—3 of Fig. 1. Fig. 4 is a vertical section on the line 4—4 of Fig. 3.

In the drawing, in which like numerals of reference indicate like parts in all of the figures, 1 represents the pit, 2 the pump proper, 3 the pit top, 4 the head bearing and 5 the drive pulley. The water discharge pipes 6 are composed of sections suitably coupled together, suspended from the pit top 3 and secured to the pump bowl in the usual manner. The line shaft 7 is also composed of sections coupled rigidly together by screw couplings 8. The number and length of the piping and shafting sections varies in practice and will depend upon the standards of length furnished by the manufacturers or the conditions that may be met with in the installation. All of the foregoing parts may be of the usual type and construction and *per se*, are not a part of the present invention.

9 designates the shaft bearings which, *per se*, and in combination with the foregoing structure, constitute the essential part of the present invention. The bearings 9 are located at any desired intervals apart say from five to seven feet and are constructed as best shown in Figs. 3 and 4 of the drawing, by reference to which it will be observed that each bearing comprises a frame or spider 10 having oppositely disposed seats 11 that are designed to receive the water discharge pipes 6 to which they are secured by the clamping rods 13 that pass through the ears 12 and are held by suitable nuts. In this way, the spiders are securely clamped to the discharge pipes and thereby form a rigid bracing between the discharge pipes and the bearings. Each bearing also includes the center bearing sleeve 14 which has an enlargement or head 15 at the top, the head being chambered as at 16 to form a lubricant reservoir. The head 15 is bored at 17 to a close running fit for the shaft 7 and the sleeve 14 is also counter-bored at 18 to receive the bearing metal bushing 19. The sleeve 14 is further counter-bored as at 20 at its lower end to receive a spiral packing 21 of a suitable material. In order to retain the packing 21, the sleeve 14 has its lower end externally threaded as at 22 to receive the packing nut 23.

24 indicates the lubricant inlet to the chamber 16 of the bearing.

Cup grease or other suitable lubricant is conveyed down to the various bearings, from a reservoir 25 at the top of the well, by a pipe line 26 in which branch T's 27 are located at intervals and from which T's the nipples 28 convey the lubricant to the bearings 9. By forcing the grease into the pipe line 26 from the reservoir 25 the chambers 16 may be kept filled with lubricant and water, sand, grit and detritus may thus be kept out of the bearings.

If desired, the several bearings may be connected by longitudinal spacing bars 29, as in my other application referred to.

From the foregoing description taken in connection with the accompanying drawing, it is thought the complete construction, operation and advantages of the invention will be clear to those skilled in the art.

What I claim is:

1. The combination with the pit top, the pump, the water discharge pipes extending from the pump to the top of the well, and the line shaft; of separate line shaft bearings located at intervals along the shaft, said bearings comprising spiders having seats for the discharge pipes, clamps for securing the pipes in their seats, sleeves carried by said spiders and bored to permit passage of the shaft, said sleeves having lubricant chambers in the upper ends and packing recesses in the lower ends, packing in said recesses, means for holding said packing in place, and a lubricant pipe line extending from the top of the well down to the various bearings and including laterals or branches for delivering lubricant into the several bearing chambers.

2. The combination with the pit top, the pump, the water discharge pipes extending from the pump to the top of the well, and the line shaft; of separate line shaft bearings located at intervals along the shaft, said bearings comprising spiders having seats for the discharge pipes, clamps for securing the pipes in their seats, sleeves carried by said spiders and bored to permit passage of the shaft, said sleeves having lubricant chambers in the upper ends and packing recesses in the lower ends, packing in said recesses, means for holding said packing in place, a lubricant pipe line extending from the top of the well down to the various bearings and including laterals or branches for delivering lubricant into the several bearings, chambers and spacing rods connecting adjacent spiders.

3. The combination with the pit top, the pump, the water discharge pipes extending from the pump to the top of the well, and the line shaft; of separate line shaft bearings located at intervals along the shaft, said bearings comprising spiders having seats for the discharge pipes, clamps for securing the pipes in their seats, sleeves carried by said spiders and bored to permit passage of the shaft, said sleeves having lubricant chambers in the upper ends and packing recesses in the lower ends, packing in said recesses, means for holding said packing in place, a lubricant pipe line extending from the top of the well down to the various bearings and including laterals or branches for delivering lubricant into the several bearing chambers, and bearing bushings held in said bearing sleeves between said lubricant chambers and said packing recesses to be lubricated by the lubricant from said chambers.

4. The combination with the pit top, the pump, the water discharge pipes extending from the pump to the top of the well, and the line shaft; of separate line shaft bearings located at intervals along the shaft, said bearings comprising spiders having seats for the discharge pipes, clamps for securing the pipes in their seats, sleeves carried by said spiders and bored to permit passage of the shaft, said sleeves having lubricant chambers in the upper ends and packing recesses in the lower ends, packing in said recesses, means for holding said packing in place, a lubricant pipe line extending from the top of the well down to the various bearings and including laterals or branches for delivering lubricant into the several bearing chambers, spacing rods connecting adjacent spiders, and bearing bushings held in said bearing sleeves between said lubricant chambers and said packing recesses to be lubricated by the lubricant from said chambers.

5. In an apparatus of the class described, the combination with the shaft and the discharge pipes paralleling the shaft, of guide bearings for the shaft located at intervals throughout the length of the same and comprising spiders having seats for the discharge pipes, clamps embracing the discharge pipes and secured to the spiders for holding the same in place, bearing sleeves carried by the spiders and formed to permit passage of the shaft, said sleeves having lubricant chambers in the upper ends and packing recesses in the lower ends, compressible packing in said recesses, packing nuts in threaded engagement with the sleeve for retaining the packing, and a lubricant duct for delivering lubricant into the lubricant chambers, substantially as shown and described.

JAMES P. NICHOLAS.

Witnesses:
 WM. A. SMITH,
 CHAS. A. BETHEL.